(12) United States Patent
Shi et al.

(10) Patent No.: US 11,150,087 B2
(45) Date of Patent: Oct. 19, 2021

(54) ANGLE AND DISTANCE MEASURING METHOD, TRAJECTORY DIAGRAM DRAWING METHOD, AND LASER RANGING SYSTEM

(71) Applicant: NORTHWEST INSTRUMENT INC., Dover, NJ (US)

(72) Inventors: Xin Shi, Shanghai (CN); David Xing, Dover, NJ (US)

(73) Assignee: NORTHWEST INSTRUMENT INC., Dover, NJ (US)

( * ) Notice: Subject to any disclaimer, the term of this patent is extended or adjusted under 35 U.S.C. 154(b) by 0 days.

(21) Appl. No.: 16/636,536

(22) PCT Filed: Jul. 25, 2018

(86) PCT No.: PCT/CN2018/096946
§ 371 (c)(1),
(2) Date: Feb. 4, 2020

(87) PCT Pub. No.: WO2019/024731
PCT Pub. Date: Feb. 7, 2019

(65) Prior Publication Data
US 2021/0156679 A1    May 27, 2021

(30) Foreign Application Priority Data
Aug. 4, 2017    (CN) .......................... 201710662589.5

(51) Int. Cl.
*G01B 11/26* (2006.01)
*G01C 1/00* (2006.01)
*G01S 17/06* (2006.01)

(52) U.S. Cl.
CPC ................ *G01B 11/26* (2013.01); *G01C 1/00* (2013.01); *G01S 17/06* (2013.01)

(58) Field of Classification Search
CPC ...... G01B 11/26; G01B 11/2545; G01C 1/00; G01C 3/10; G01C 17/00; G01C 19/00;
(Continued)

(56) References Cited

U.S. PATENT DOCUMENTS 9,188,430 B2 * 11/2015 Atwell ..................... G01S 17/86
9,686,532 B2 *  6/2017 Tohme .................. G01S 7/4808
(Continued)

FOREIGN PATENT DOCUMENTS

CN          103345269 A       10/2013
CN          104061911 A        9/2014
(Continued)

OTHER PUBLICATIONS

World Intellectual Property Organization (WIPO) International Search Report for PCT/CN2018/096946 dated Oct. 31, 2018 6 pages.

*Primary Examiner* — Isiaka O Akanbi
(74) *Attorney, Agent, or Firm* — Anova Law Group, PLLC

(57) ABSTRACT

The present disclosure provides a method for measuring an angle and a distance. The method includes: at an initial position, after a laser emitting device aligns with a laser receiving device, recording a first angle and measuring a first distance between the laser emitting device and the laser receiving device; and moving the laser receiving device from the initial position to a first position, and after the laser emitting device realigns with the laser receiving device, recording a second angle and measuring a second distance between the laser emitting device and the laser receiving device. The method for measuring the angle and the distance creatively records the corresponding angle and distance at different positions, respectively, such that the position of the laser receiving device relative to the laser emitting device is accurately determined.

19 Claims, 3 Drawing Sheets

(58) Field of Classification Search
CPC ..... G01C 15/002; G01S 17/06; G01S 7/4972; G01S 17/86; G01S 17/66; G01S 7/4817; G01S 7/4808; G01S 17/89; G02B 6/32
USPC .................................. 356/614, 138
See application file for complete search history.

(56) References Cited

U.S. PATENT DOCUMENTS

| | | | |
|---|---|---|---|
| 2013/0229512 A1* | 9/2013 | Steffey | G06F 3/017 348/135 |
| 2015/0226841 A1* | 8/2015 | Luthi | G01S 7/497 356/5.01 |
| 2015/0253124 A1* | 9/2015 | Steffey | G01B 11/002 356/614 |
| 2016/0209500 A1* | 7/2016 | Markendorf | G01S 7/4972 |

FOREIGN PATENT DOCUMENTS

| | | |
|---|---|---|
| CN | 205317206 U | 6/2016 |
| CN | 106802412 A | 6/2017 |
| EP | 2639548 A1 | 9/2013 |

* cited by examiner

ANGLE AND DISTANCE MEASURING METHOD, TRAJECTORY DIAGRAM DRAWING METHOD, AND LASER RANGING SYSTEM

CROSS-REFERENCES TO RELATED APPLICATIONS

This application is a national phase entry under 35 U.S.C. § 371 of International Application No. PCT/CN2018/096946, filed on Jul. 25, 2018, which claims the priority to Chinese Patent Application No. 201710662589.5, filed on Aug. 4, 2017, the entire contents of which are incorporated herein by reference.

FIELD OF THE DISCLOSURE

The present disclosure generally relates to the field of distance measurement and positioning and, more particularly, relates to a method for measuring an angle and a distance, a method for plotting a trajectory map, and a laser ranging system employing the methods thereof.

BACKGROUND

In the existing technology, a level projects a visible laser beam, and then an elevation can be accurately located according to the laser beam. The level may also be driven by a rapidly rotating shaft to sweep a visible laser beam (generally a red or green light beam) at a same elevation for an engineer to locate the same elevation.

At present, based on the operation principle of the laser level, the presence or absence of an additional compensation mechanism, and the type of the compensation mechanism, the commonly available level may be generally categorized into three types: a bubble leveling laser level, a self-leveling laser level, and an electronic automatic leveling laser level.

The bubble leveling laser level has a simple structure and a low cost so that the bubble leveling laser level is a popular instrument suitable for construction work such as building construction and interior decoration. Laser light emitted from a laser diode contained in the bubble leveling laser level passes through an objective lens to obtain a laser beam. The laser beam is split into two beams after passing through a pentagonal prism. One of the two beams passes directly and the other beam changes its direction by about 90 degrees. A rotating head of the instrument is driven by an electric motor through a belt to rotate and form a scanning laser plane. A long bubble level is configured on the instrument for leveling the instrument. Similar to the bubble level, the instrument uses the bubble level as a reference. In other words, the accuracy of the leveling of the laser plane depends on the precision of the bubble level. When the instrument is placed horizontally, a laser scanned vertical plane is obtained based on a vertical bubble level. The accuracy of the instrument is substantially affected by human factors. Because construction and engineering operations require convenience and swiftness and certain special applications require high accuracy, the bubble level is unable to satisfy these requirements. Thus, a variety of automatic leveling laser instruments and unique leveling methods become available to satisfy these requirements.

The automatic leveling laser level is an instrument using a wire suspended optical compensator to achieve the objective of automatic leveling within a certain range. No matter how the instrument is tilted, the scanned laser plane always maintains leveled or horizontal within a compensation range. The instrument is suitable for construction sites having substantial vibrations.

The electronic automatic leveling laser level includes an opto-mechanical compensator and has the advantages of a simple structure, a low cost, and insensitivity to vibrations. However, the compensation accuracy decreases as the compensation range increases. Generally, the compensation accuracy is limited to about $1/10^{th}$ inch at 100 feet. Recently developed electronic automatic leveling mechanisms expand the compensation range while maintaining substantially high stability and compensation accuracy.

In all three types of laser levels described above, the rotating head of the instrument facilitates sweeping the laser beam to form the scanned laser plane, thereby instructing the operator to perform corresponding construction operation. In these types of the levels, because the laser beam only sweeps on the leveled plane, the instruments may be implemented sufficiently with the rotating head without the need for rotating the instruments themselves. Correspondingly, the instruments require a solid base to stably fix the levels to a reference surface.

Because the levels are required to be fixed to the reference surface, the levels are unable to rotate to follow movement of a detector. Thus, the levels are unable to measure different distances at different angles and unable to plot a trajectory map of a traveling route of the detector.

BRIEF SUMMARY OF THE DISCLOSURE

In response to the above technical problems, that is, the level in the existing technology is unable to measure different distances at different angles or to plot a trajectory map of a laser receiving device, one aspect of the present disclosure provides a method for measuring an angle and a distance. The method includes: at an initial position, after a laser emitting device aligns with a laser receiving device, recording a first angle and measuring a first distance between the laser emitting device and the laser receiving device; and moving the laser receiving device from the initial position to a first position, and after the laser emitting device realigns with the laser receiving device, recording a second angle and measuring a second distance between the laser emitting device and the laser receiving device.

In one embodiment consistent with the present disclosure, the laser receiving device includes a timing circuit configured to obtain a difference between the first angle and the second angle. The timing circuit is reset at the initial position.

The method for measuring the angle and the distance creatively records the corresponding angle and distance at different positions, respectively, such that the position of the laser receiving device relative to the laser emitting device is accurately determined.

In one embodiment consistent with the present disclosure, the method further includes: rotating the laser receiving device around the laser emitting device for at least one round. As such, after the laser receiving device rotates around the laser emitting device for at least one round, the laser emitting device is able to measure or calculate a distance at a corresponding direction to determine a trajectory of the laser receiving device.

In one embodiment consistent with the present disclosure, the method further includes: after the laser emitting device aligns with the laser receiving device, recording at a predetermined time interval a rotated angle of the laser emitting device and a corresponding distance between the laser emitting device and the laser receiving device. As such, the trajectory of the laser receiving device is accurately obtained.

In one embodiment consistent with the present disclosure, the first angle and the second angle are recorded as a difference between a current direction and a true north direction. As such, the trajectory of the laser receiving device is associated with the directions, thereby preparing for subsequent matching of the trajectory of the laser receiving device to a corresponding map.

In one embodiment consistent with the present disclosure, the true north direction is indicated by means of an orientation sensor. Those skilled in the art should understand that the orientation sensor includes, but is not limited to, a gyroscope, an electronic compass, and a code wheel.

In one embodiment consistent with the present disclosure, the method further includes: recording and saving the first angle and the first distance as one pair; and recording and saving the second angle and the second distance as another pair. As such, the corresponding angle and distance are saved in one pair, thereby providing convenience for subsequent plotting.

In one embodiment consistent with the present disclosure, measuring the first distance between the laser emitting device and the laser receiving device further includes: using a first laser emitting component of the laser emitting device to emit a vertical laser beam rotating in a vertical plane at a first rotation speed; using a first optical detection component and a second optical component that are at least partially located on a same vertical plane to calculate a time difference when the vertical laser beam reaches the first optical detection component and the second optical detection component, where a distance between the two optical components is called a first separation distance; and according to the first rotation speed, the first separation distance, and the time difference, calculating the first distance.

In one embodiment consistent with the present disclosure, the laser receiving device is vertically set by a universal joint or a horizontally-set bearing.

In one embodiment consistent with the present disclosure, the laser receiving device is vertically set by an angle sensor and a control motor.

In one embodiment consistent with the present disclosure, the laser receiving device includes the timing circuit configured to obtain the difference between the first angle and the second angle. The timing circuit is reset at the initial position.

Another aspect of the present disclosure provides a method for plotting a trajectory map. The method includes: at an initial position, after a laser emitting device aligns with a laser receiving device, recording a first angle and measuring a first distance between the laser emitting device and the laser receiving device, and recording and saving the first angle and the first distance as a first data pair; moving the laser receiving device from the initial position to at least one first position, and after the laser emitting device realigns with the laser receiving device, recording at least one second angle and measuring at least one second distance between the laser emitting device and the laser receiving device, and recording and saving the at least one second angle and the at least one second distance as at least one second data pair; and based on the first data pair and the at least one second data pair, plotting the trajectory map of the laser receiving device.

The method for plotting the trajectory map obtains the angles and the distances when the laser receiving device is located at at least two positions, thereby achieving determining the trajectory of the laser receiving device.

In one embodiment consistent with the present disclosure, the method further includes: rotating the laser receiving device around the laser emitting device for at least one round.

In one embodiment consistent with the present disclosure, the method further includes: after the laser emitting device aligns with the laser receiving device, recording at a predetermined time interval a rotated angle of the laser emitting device and a corresponding distance between the laser emitting device and the laser receiving device.

In one embodiment consistent with the present disclosure, the first angle and the second angle are recorded as a difference between a current direction and a true north direction.

In one embodiment consistent with the present disclosure, the true north direction is indicated by means of an orientation sensor. Those skilled in the art should understand that the orientation sensor includes, but is not limited to, a gyroscope, an electronic compass, and a code wheel.

In one embodiment consistent with the present disclosure, measuring the first distance between the laser emitting device and the laser receiving device further includes: using a first laser emitting component of the laser emitting device to emit a vertical laser beam rotating in a vertical plane at a first rotation speed; using a first optical detection component and a second optical component that are at least partially located on a same vertical plane to calculate a time difference when the vertical laser beam reaches the first optical detection component and the second optical detection component, where a distance between the two optical components is called a first separation distance; and according to the first rotation speed, the first separation distance, and the time difference, calculating the first distance.

Further, another aspect of the present disclosure provides a laser ranging system. The laser ranging system is configured implement the disclosed method for measuring the angle and the distance or the disclosed method for plotting the trajectory map.

As such, the method for measuring the angle and the distance creatively records the corresponding angle and distance at different positions, respectively, such that the position of the laser receiving device relative to the laser emitting device is accurately determined.

BRIEF DESCRIPTION OF THE DRAWINGS

Embodiments are shown and described with reference to the accompanying drawings. The drawings clarify basic principles, thereby showing only the aspects necessary for understanding the basic principles. The drawings are not drawn to scale. In the drawings, same reference numerals denote similar features.

Other features, characteristics, advantages and benefits of the present disclosure will become more apparent from the detailed description below in conjunction with the accompanying drawings.

DETAILED DESCRIPTION

To make the foregoing objectives, features and advantages of the present disclosure clearer and more understandable, the present disclosure will be further described with reference to the accompanying drawings and embodiments. The attached drawings are for reference only and are not intended to limit the present disclosure.

In the following detailed description of the preferred embodiments, reference will be made to the accompanying drawings, forming a part thereof. The accompanying drawings show specific embodiments as examples for implementing the present disclosure. The exemplary embodiments are not intended to be exhaustive of all embodiments according to the present disclosure. It can be understood that other embodiments may be used, and structural or logical modifications may be made without departing from the scope of the present disclosure. Thus, the detailed description below is not restrictive, and the scope of the present disclosure us defined by the appended claims.

The applicant of this application wishes to make clear that the terms "horizontal setting" and "vertical setting" mentioned in the context of this application both refer to the arrangement of photosensitive elements included in an optical detection component of a laser receiving device. The term "vertical setting" means that the photosensitive elements such as stripes included in the optical detection component of the laser receiving device are arranged substantially perpendicular to a horizontal plane while the term "horizontal setting" means that the photosensitive elements such as stripes included in the optical detection component of the laser receiving device are arranged substantially on a same horizontal plane.

Figure 1:
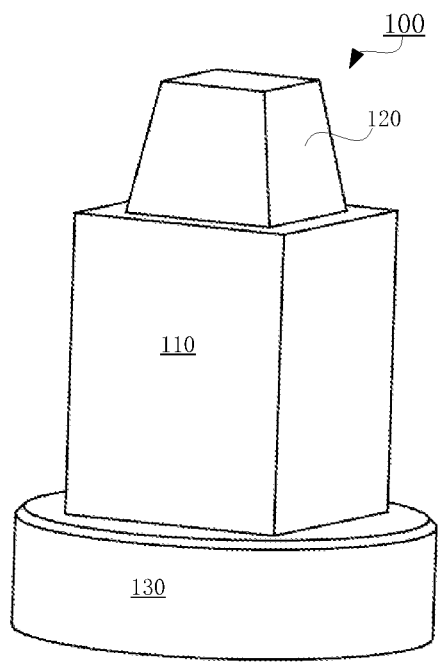
FIG. 1 illustrates a schematic diagram of an example of a laser emitting device 100 according to the existing technology.

FIG. 1 illustrates a schematic diagram of an example of a laser emitting device according to the existing technology. As shown in FIG. 1, the laser emitting device 100 according to the existing technology, such as a level, includes a base 130, a housing 110 fixed to the base 130, and a rotating head 120 mounted on the upper part of the housing 110. The rotating head 120 is able to sweep a plane and to show the plane to a construction worker to instruct the construction worker to perform subsequent operations. In the existing technology, because the rotating head 120 is able to rotate to form a laser scanned leveling plane through a laser beam, it is only necessary to fix the housing 110 relative to the base 130. In addition, because the rotating head 120 rotates during the operation, to make the rotating head 120 sufficiently stable when rotating, the housing 110 may be securely fixed to the base 130, such that the laser emitting device 100 is able to stably sweep the laser plane.

To overcome the above technical bias, that is, the housing 110 has to be securely fixed to the base 130 in the existing technology, the laser emitting device according to the present disclosure includes: a housing, a first laser emitting component configured to be rotatably mounted on the housing, a base coupled to the housing, and a driving mechanism configured to rotate the housing at a pre-determined angle in a first plane. Equipped with the driving mechanism, the laser emitting device according to the present disclosure includes the housing capable of rotating relative to the base, thereby achieving adjusting the direction of the laser beam in a vertical plane. The laser emitting device according to the present disclosure overcomes the technical bias that the base is configured not to rotate relative to the housing in the existing technology and creatively introduces the driving mechanism to drive the base to rotate relative to the housing to adjust the direction of the laser beam in the vertical plane.

The first laser emitting component is configured to emit an automatically leveled laser beam in a vertical direction. As such, the laser emitting device is able to emit the automatically leveled laser beam in the vertical direction, that is, the laser beam perpendicular to the horizontal plane, thereby facilitating subsequent marking.

The laser emitting device further includes a second laser emitting component configured to be rotatably mounted on the housing. As such, the laser emitting device is able to not only emit the laser beam in the vertical direction, but also emit another laser beam not in the vertical direction.

The second laser emitting component is configured to emit automatically leveled laser beam in a horizontal direction. As such, the laser emitting device is able to emit automatically leveled laser beam in the horizontal direction, thereby facilitating the subsequent marking.

The laser beam emitted from the first laser emitting component forms the first plane and the laser beam emitted from the second laser emitting component forms a second plane. The first plane and the second plane are perpendicular to each other. As such, the laser emitting device is able to emit the automatically leveled laser beam in the vertical direction and the automatically leveled laser beam in the horizontal direction perpendicular to the vertical direction, thereby facilitating the subsequent marking.

The driving mechanism includes an electric motor. In one embodiment, the electric motor is a stepper motor. As such, an amount of rotation by the stepper motor can be controlled, thereby providing the possibility for subsequent positioning by means of the laser emitting device.

The base is marked with an angle scale. As such, it is possible to visually monitor an angle of the rotation of the housing driven by the driving mechanism.

The laser emitting device further includes a control circuit configured to control the amount of the rotation by the driving mechanism. As such, the control circuit is able to rapidly control the amount of the rotation by the driving mechanism.

The control circuit of the laser emitting device is coupled with the laser receiving device for detecting the laser beam emitted from the laser emitting device. As such, the control circuit is able to communicatively couple with the laser receiving device for detecting the laser beam emitted from the laser emitting device. Thus, the amount of the rotation by the driving mechanism can be controlled through the feedback from the laser receiving device for detecting the laser beam emitted from the laser emitting device.

The control circuit is configured to control the amount of the rotation by the driving mechanism through the feedback signal from the laser receiving device. As such, the control circuit is able to communicatively couple with the laser receiving device for detecting the laser beam emitted from the laser emitting device. Thus, the amount of the rotation by the driving mechanism can be controlled through the feedback signal from the laser receiving device for detecting the laser beam emitted from the laser emitting device.

Because the laser emitting device according to the present disclosure includes the driving mechanism, the housing of the laser emitting device may rotate relative to the base, thereby achieving adjusting the direction of the laser beam in the vertical plane. The laser emitting device according to the present disclosure overcomes the technical bias that the base is configured not to rotate relative to the housing in the existing technology and creatively introduces the driving mechanism to drive the base to rotate relative to the housing to adjust the direction of the laser beam in the vertical plane.

In the case that the base rotates relative to the housing when driven by the driving mechanism, it is not yet possible to plot a motion trajectory of a detector of a laser receiving circuit. It is also required that a laser emitting circuit is able to track the laser receiving circuit and to measure a relative position of the laser emitting circuit relative to the laser receiving circuit at a specific moment. The relative position includes both an angle and a distance.

Figure 2:
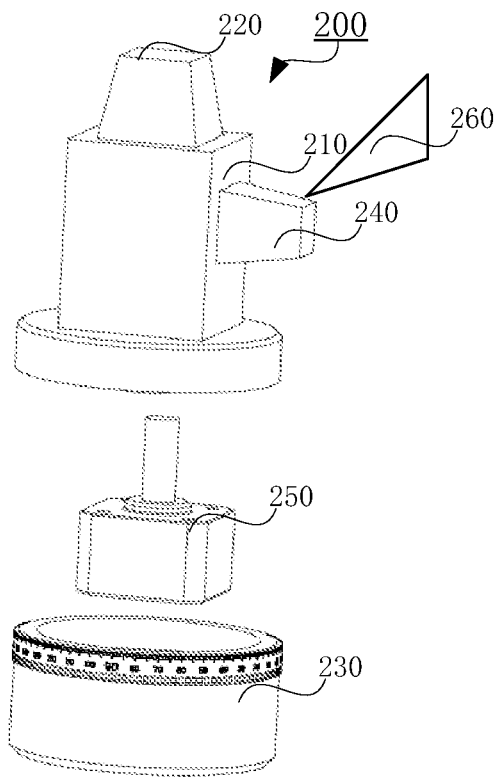
FIG. 2 illustrates a schematic diagram of an example of a laser emitting device 200 used in a method according to some embodiments of the present disclosure.
Figure 3:
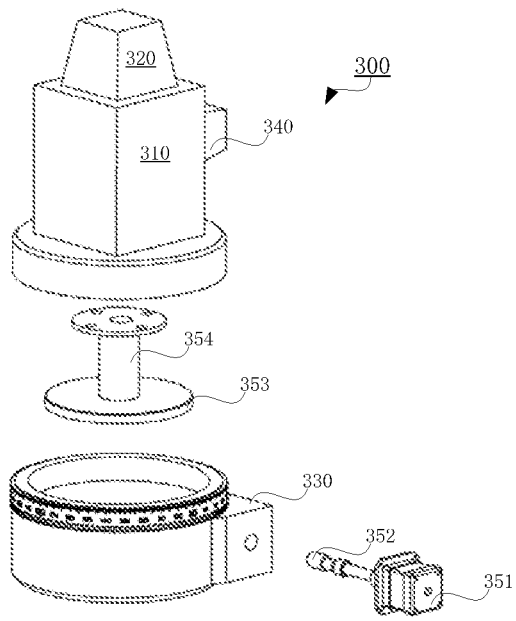
FIG. 3 illustrates a schematic diagram of another example of a laser emitting device 300 used in a method according to some embodiments of the present disclosure.

The laser emitting devices 200 and 300 used in illustrating the tracking method according to the present disclosure are shown below in FIG. 2 and FIG. 3. FIG. 2 illustrates a schematic diagram of an example of a laser emitting device used in a method according to some embodiments of the present disclosure. FIG. 3 illustrates a schematic diagram of another example of a laser emitting device used in a method according to some embodiments of the present disclosure.

As shown in FIG. 2, the laser emitting device 200 (e.g., the level 200) used in the tracking method according to the present disclosure includes a housing 200 and a first laser emitting component 240. The first laser emitting component 240 (e.g., a rotating head 240) is configured to be rotatably mounted on the housing 210, such that the first laser emitting component 240 is able to rotate in a plane to sweep a laser beam to form a leveling plane. In addition, the laser emitting device 200 further includes a base 230 coupled with the housing 210. Moreover, the laser emitting device 200 further includes a driving mechanism 250. The driving mechanism 250 is configured to drive the housing 210 to rotate at a pre-determined angle in the first plane. Because the laser emitting device 200 used in the tracking method according to the present disclosure includes the driving mechanism 250, the housing 210 of the laser emitting device 200 may rotate relative to the base 230, thereby achieving adjusting the direction of a rotating laser plane emitted from the first laser emitting component such as the rotating head 240. The laser emitting device 200 used in the tracking method according to the present disclosure overcomes the technical bias that the base 130 is configured not to rotate relative to the housing 110 in the existing technology and creatively introduces the driving mechanism 250 to drive the base 230 to rotate relative to the housing 210 to adjust the direction of the laser beam. The first laser emitting component 240 is configured to emit the automatically leveled laser beam in the vertical direction.

In addition, as shown in FIG. 2, the laser emitting device 200 further includes a second laser emitting component 220 configured to be rotatably mounted on the housing 210. The second laser emitting component 220 is further configured to emit the automatically leveled laser beam in the horizontal direction. In one embodiment, as shown in FIG. 2, the laser beam emitted from the first laser emitting component 240 forms the first plane and the laser beam emitted from the second laser emitting component 220 forms the second plane. The first plane and the second plane are perpendicular with each other. In one embodiment, as shown in FIG. 2, the driving mechanism 250 includes an electric motor. More specifically, the electric motor is configured to be a stepper motor. As such, the amount of the rotation by the stepper motor can be controlled, thereby providing the possibility for subsequent positioning by means of the laser emitting device. In the tracking process, the rotated angle of the laser emitting device may also be directly obtained from the rotated angle of the electric motor, thereby obtaining angles corresponding to different positions to which the laser receiving device is moved. In one embodiment, as shown in FIG. 2, the base 230 is marked with an angle scale. As such, it is possible to visually monitor an angle of the rotation of the housing driven by the driving mechanism 250. In addition, the laser emitting device 200 also includes a control circuit (not shown in the drawing) configured to control the amount of the rotation by the driving mechanism 250. In this way, the control circuit of the laser emitting device 200 is coupled with the laser receiving device (not shown in the drawing) for detecting the laser beam emitted from the laser emitting device 200. The control circuit is configured to control the amount of the rotation by the driving mechanism 250 through the feedback signal from the laser receiving device. In one embodiment, as shown in FIG. 2, the driving mechanism 250 is directly mounted inside the housing 210 and an output shaft of the driving mechanism 250 is directly or indirectly installed to the housing 210 to drive the housing 210 to rotate relative to the base 230.

As shown in FIG. 3, the laser emitting device 300 (e.g., the level 300) used in the tracking method according to the present disclosure includes a housing 310 and a first laser emitting component 340. The first laser emitting component 340 (e.g., a rotating head 340) is configured to be rotatably mounted on the housing 310, such that the first laser emitting component 340 is able to rotate in a plane to sweep a laser beam to form a leveling plane. In addition, the laser emitting device 300 further includes a base 330 coupled with the housing 310. Moreover, the laser emitting device 300 further includes a driving mechanism. The driving mechanism is configured to drive the housing 310 to rotate at a pre-determined angle in the first plane. Because the laser emitting device 300 used in the tracking method according to the present disclosure includes the driving mechanism, the housing 310 of the laser emitting device 300 may rotate relative to the base 330, thereby achieving adjusting the direction of a rotating laser plane emitted from the first laser emitting component 340 such as the rotating head 340. The laser emitting device 300 used in the tracking method according to the present disclosure overcomes the technical bias that the base 130 is configured not to rotate relative to the housing 110 in the existing technology and creatively introduces the driving mechanism to drive the base 330 to rotate relative to the housing 310 to adjust the direction of the laser beam. The first laser emitting component 340 is configured to emit the automatically leveled laser beam in the vertical direction.

In addition, as shown in FIG. 3, the laser emitting device 300 further includes a second laser emitting component 320 configured to be rotatably mounted on the housing 310. The second laser emitting component 320 is further configured to emit the automatically leveled laser beam in the horizontal direction. In one embodiment, as shown in FIG. 3, the laser beam emitted from the first laser emitting component 340 forms the first plane and the laser beam emitted from the second laser emitting component 320 forms the second plane. The first plane and the second plane are perpendicular with each other. In one embodiment, as shown in FIG. 3, the driving mechanism includes an electric motor 351. More specifically, the electric motor is configured to be a stepper motor. As such, the amount of the rotation by the stepper motor can be controlled, thereby providing the possibility for subsequent positioning by means of the laser emitting device. In one embodiment, as shown in FIG. 3, the base 330 is marked with an angle scale. As such, it is possible to visually monitor an angle of the rotation of the housing driven by the driving mechanism. In addition, the laser emitting device 300 also includes a control circuit (not shown in the drawing) configured to control the amount of the rotation by the driving mechanism. In this way, the control circuit of the laser emitting device 300 is coupled with the laser receiving device (not shown in the drawing) for detecting the laser beam emitted from the laser emitting device 300. The control circuit is configured to control the amount of the rotation by the driving mechanism through the feedback signal from the laser receiving device. In one embodiment, as shown in FIG. 3, the driving mechanism includes an electric motor 351, a drive shaft 352, a drive wheel 353, and a connecting shaft 354. The electric motor is installed inside the housing 310. The output shaft of the electric motor 351 directly or indirectly coupled with the drive shaft 352 drives the housing 310 to rotate relative to the base 330 through the drive wheel 353 and the connecting shaft 354.

Figure 4:
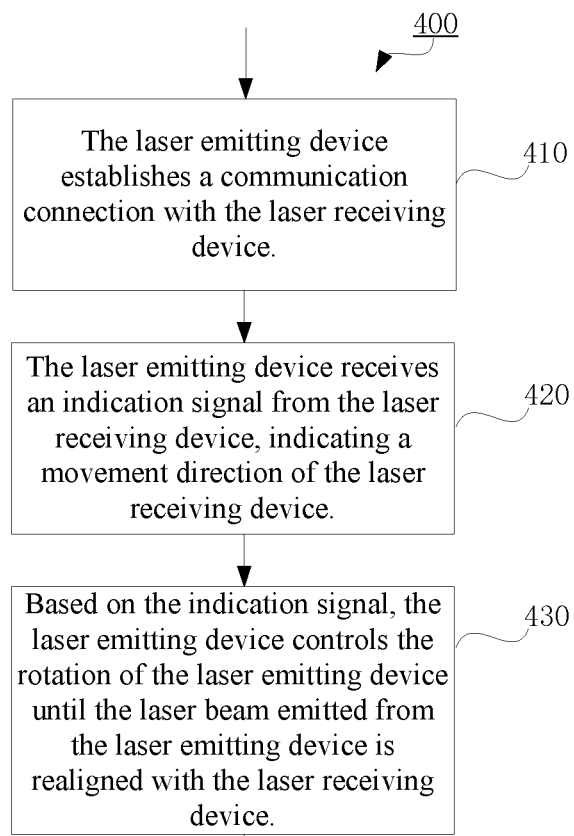
FIG. 4 illustrates a schematic diagram of an example of a tracking method 400 for tracking a laser receiving device by a laser emitting device according to some embodiments of the present disclosure.

After the structure of the laser emitting device according to the present disclosure is described, the tracking method for tracking the laser receiving device in the laser emitting device is described below. As shown in FIG. 4, the tracking method (400) for tracking the laser receiving device in the laser emitting device includes: establishing, by the laser emitting device, a communication connection with the laser receiving device 010); receiving, by the laser emitting device, an indication signal from the laser receiving device, indicating a movement direction of the laser receiving device (420); and based on the indication signal, controlling, by the laser emitting device, the rotation of the laser emitting device until the laser beam emitted from the laser emitting device is realigned with the laser receiving device (430). Under the circumstance that the laser emitting device (e.g., the level) rotates, the tracking method for tracking the laser receiving device in the laser emitting device enables the laser emitting device to obtain the movement direction of the laser receiving device through the communication connection established between the laser emitting device and the laser receiving device (e.g., the laser receiver), such that the laser emitting device is able to control the movement direction of itself based on the movement direction of the laser receiving device, thereby achieving the tracking of the laser receiving device by the laser emitting device.

Based on the indication signal, controlling, by the laser emitting device, the rotation of the laser emitting device further includes: based on the indication signal, controlling, by the laser emitting device, the rotation of the stepper motor included in the laser emitting device. As such, using the stepper motor effectively controls the rotation of the laser emitting device. In addition, using the stepper motor to control the amount of the rotation has the advantages of accurate control and high precision.

The tracking method further includes: recording initially aligned positions of the laser emitting device and the laser receiving device as a first angle. In one embodiment, the tracking method further includes: recording the realigned positions of the laser emitting device and the laser receiving device as a second angle. In one embodiment, the first angle and the second angle are determined according to the angle scale (e.g., the angle scale on the base 230 and 330 in FIG. 2 and FIG. 3, respectively) included in the laser emitting device. In addition, the in one embodiment, the tracking method further includes: detecting, by the laser emitting device, a distance between the laser emitting device and the laser receiving device. As such, as the laser receiving device moves, the laser emitting device is able to measure the distances between the laser emitting device and the laser receiving device when the laser emitting device aligns with the laser receiving device at different angles. In one embodiment, the first angle and the second angle are determined according to the rotation angles of the stepper motor.

For example, the first angle is a true north direction, that is, at the beginning of the measurement, the laser receiver of the laser receiving device is located at the true north direction of the laser emitting device such as the level. At this time, the laser beam emitted from the laser emitting device aligns with the laser receiving device and measures the distance between the laser emitting device and the laser receiving device as about 5 meters. Then, the laser receiving device moves toward the east (not necessarily at the true east direction). The laser receiving device sends a signal indicating the movement direction to the laser emitting device. As previously described, the signal may be in an electrical form or in an optical form. After receiving the signal, the laser emitting device controls the stepper motor included in the laser emitting device to rotate according to the signal indicating the movement direction, for example, rotate in a clockwise direction in the case of a top view. As the laser beam emitted from the laser emitting device realigns with the laser receiving device at the second angle (e.g., about 10 degrees northeast), the distance between the laser emitting device and the laser receiving device is measured as about 6 meters. Thus, as the laser receiving device moves, the laser emitting device is able to measure the different distances at the different angles.

The establishing the communication connection between the laser emitting device and the laser receiving device includes establishing a wireless communication connection and/or an optical signal communication connection between the laser emitting device and the laser receiving device. As such, through the electrical or the optical communication link, the communication connection between the laser emitting device and the laser receiving device is established, such that the movement direction of the laser receiving device is sent to the laser emitting device in the form of the electrical or optical signal to instruct the laser emitting device to rotate to track the laser receiving device.

To achieve the alignment and the distance measurement, the laser receiving device according to the present disclosure is configured with a second laser receiving circuit for receiving the laser beam emitted from the second laser emitting component of the laser emitting device and a first laser receiving circuit configured to be substantially perpendicular to the second laser receiving circuit for receiving the laser beam emitted from the first laser emitting component of the laser emitting device. The second laser receiving circuit includes two parts separated by a certain distance and may include a first optical detection component and a second optical detection component, which are configured in parallel with each other. After the realignment is achieved, the second laser receiving circuit is used to align with the searched horizontal laser plane emitted from the second laser emitting component to ensure that the laser receiving device is always located on a same reference plane during the measurement of the different points and to ensure the accuracy of the data of the angles and the distances collected at the different positions. Then, through adjusting the laser emitting device, the laser beam emitted from the first laser emitting component in the vertical direction is received by the first optical detection component and the second optical detection component of the first laser receiving device. Thus, the realignment is achieved and the distance measurement is secured. Measuring, by the laser emitting device, the distance between the laser emitting device and the laser receiving device further includes: using the first laser emitting component of the laser emitting device to emit the vertical laser beam rotating in the vertical plane at a first rotation speed; using the first optical detection component and the second optical component that are at least partially located on the same vertical plane to calculate a time difference when the vertical laser beam reaches the first optical detection component and the second optical detection component, where a distance between the two optical components is called a first separation distance; and according to the first rotation speed, the first separation distance, and the time difference, calculating a first distance between the laser emitting device and the laser receiving device. The laser receiving device is vertically set by a universal joint or a horizontally-set bearing and/or the laser receiving device is vertically set by an angle sensor and a control motor.

Under the circumstance that the laser emitting device (e.g., the level) rotates, the tracking method for tracking the laser receiving device in the laser emitting device enables the laser emitting device to obtain the movement direction of the laser receiving device through the communication connection established between the laser emitting device and the laser receiving device (e.g., the laser receiver), such that the laser emitting device is able to control the movement direction of itself based on the movement direction of the laser receiving device, thereby achieving the tracking of the laser receiving device by the laser emitting device.

Figure 5:
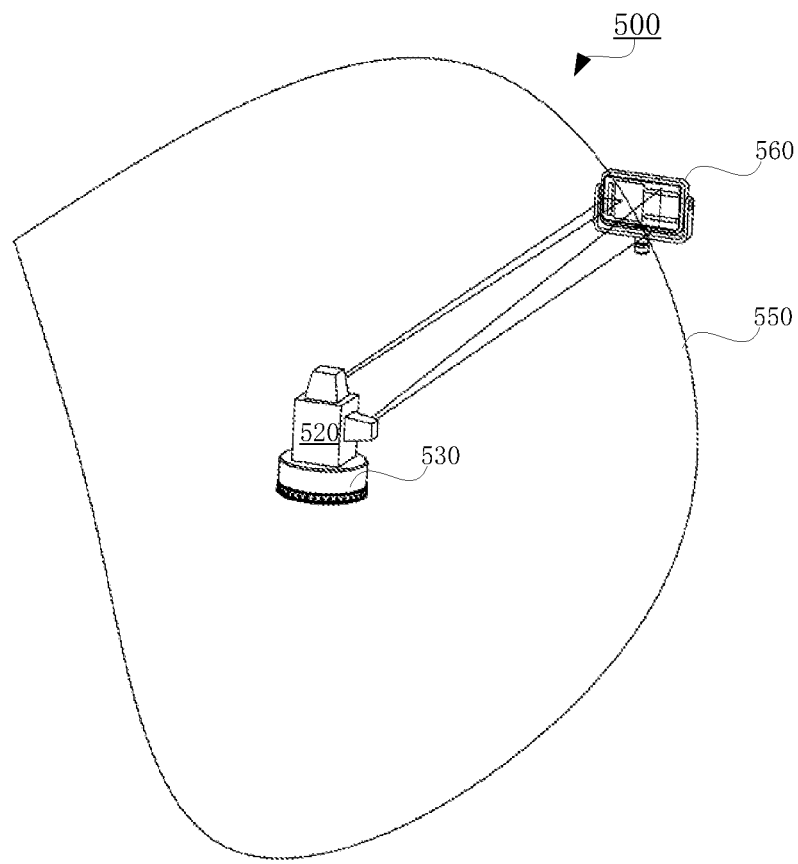
FIG. 5 illustrates a schematic diagram 500 of an example of a method for measuring an angle and a distance and plotting a trajectory map according to some embodiments of the present disclosure.
Figure 6:
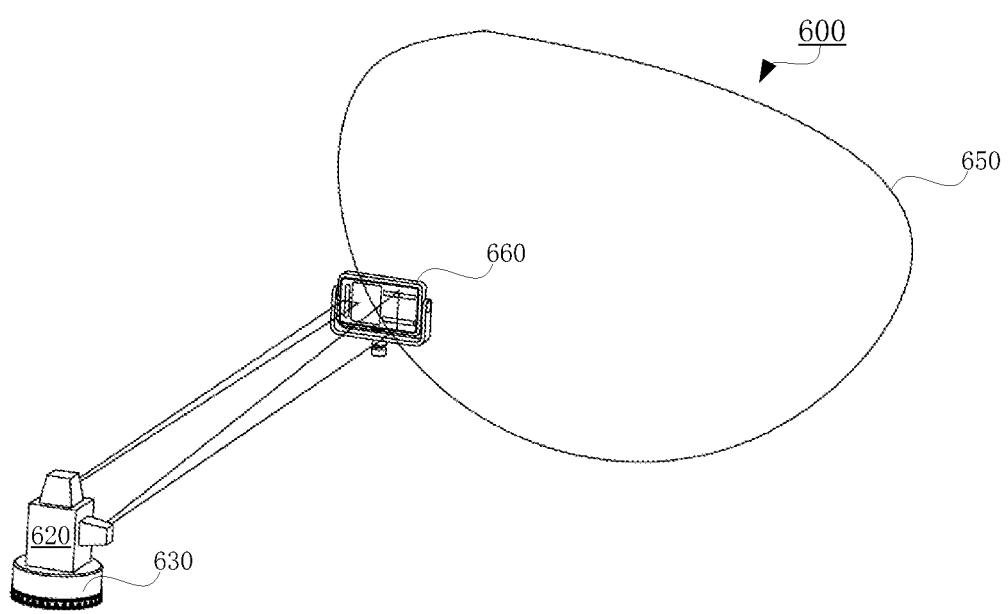
FIG. 6 illustrates a schematic diagram 600 of another example of a method for measuring an angle and a distance and plotting a trajectory map according to some embodiments of the present disclosure.

Under the circumstance that the laser emitting device is able to track the laser receiving device, the following describes how to measure the pair of the angle and the distance and how to use the obtained angle and distance data to plot a trajectory map of the laser receiving device in conjunction with FIG. 5 and FIG. 6.

FIG. 5 illustrates a schematic diagram of an example of a method for measuring an angle and a distance and plotting a trajectory map according to some embodiments of the present disclosure. FIG. 6 illustrates a schematic diagram of another example of a method for measuring an angle and a distance and plotting a trajectory map according to some embodiments of the present disclosure.

As shown in FIG. 5, the method according to the present disclosure uses the laser emitting device (e.g., the laser emitting device 520 such as the laser level shown in the center of FIG. 5) to measure the angle and the distance. Specifically, at an initial position, that is, at the position where the laser receiving device 560 (e.g., the detector) is located, the method records the angle (e.g., θ1) and measures the distance l1 between the laser emitting device 520 and the laser receiving device 560 after the laser emitting device 520 aligns with the laser receiving device 560. Then, the laser receiving device 560 moves for a certain distance. The method records the angle (e.g., θ2) and measures the distance l2 between the laser emitting device 520 and the laser receiving device 560 after the laser emitting device 520 realigns with the laser receiving device 560. In one embodiment, as shown in FIG. 5, the laser receiving device 560 rotates around the laser emitting device 520 for at least one round. Those skilled in the art should understand that the one round of the rotation is not necessarily in a shape shown in FIG. 5 and may be in other shapes. The above-described scheme artificially determines at which point the relative angle and the distance are measured. The method according to the present disclosure may also record at a pre-determined time interval the rotated angle of the laser emitting device 520 and the corresponding distance between the laser emitting device 520 and the laser receiving device 560. As such, the trajectory 550 of the laser receiving device 560 is accurately obtained. For example, the angle θ1 and the angle θ2 are recorded as a difference between the current direction and the true north direction. As such, the trajectory (e.g., 550) of the laser receiving device 560 is associated with the directions, preparing for subsequent matching of the trajectory of the laser receiving device 560 to a corresponding map.

In a specific operation, after the laser emitting device 520 measures the angle and the distance at one position, the angle θ1 and the distance l1 are recorded and saved as one pair and the angle θ2 and the distance l2 are recorded and saved as another pair. The more such data pairs are collected and the shorter the collection time interval is, the more accurate the trajectory 550 of the detector of the laser receiving device 560 is. In one embodiment, the true north direction is indicated by an orientation sensor. Those skilled in the art should understand that the orientation sensor herein includes, but is not limited to, a gyroscope, an electronic compass, and a code wheel.

Next, after the data pairs such as (θ1, l1) and (θ2, l2) are obtained, the trajectory map of the laser receiving device 560 can be plotted based on the data pairs. The method for using the laser emitting device 520 to plot the trajectory map obtains the angles and the distances when the laser receiving device 560 is located at least at two different positions, thereby determining the trajectory of the laser receiving device 560.

In one embodiment, the method further includes: rotating the laser receiving device 560 around the laser emitting device 520 for at least one round. In one embodiment, the method further includes: after the laser emitting device 520 aligns with the laser receiving device 560, recording at the pre-determined time interval the rotated angle of the laser emitting device 520 and the corresponding distance between the laser emitting device 520 and the laser receiving device 560.

As shown in FIG. 6, the method according to the present disclosure uses the laser emitting device 602 (e.g., the laser emitting device 620 such as the laser level shown in the center of FIG. 6) to measure the angle and the distance. Specifically, at an initial position, that is, at the position where the laser receiving device 660 (e.g., the detector) is located, the method records the angle (e.g., θ3) and measures the distance l3 between the laser emitting device 620 and the laser receiving device 660 after the laser emitting device 620 aligns with the laser receiving device 660. Then, the laser receiving device 660 moves for a certain distance. The method records the angle (e.g., θ4) and measures the distance l4 between the laser emitting device 620 and the laser receiving device 660 after the laser emitting device 620 realigns with the laser receiving device 660. In one embodiment, as shown in FIG. 6, the laser receiving device 660 is located at one side of the laser emitting device 620 and does not rotate around the laser emitting device 620 for at least one round. The above-described scheme artificially determines at which point the relative angle and the distance are measured. The method according to the present disclosure may also record at the pre-determined time interval the rotated angle of the laser emitting device 620 and the corresponding distance between the laser emitting device 620 and the laser receiving device 660. As such, the trajectory of the laser receiving device 660 is accurately obtained. For example, the angle θ3 and the angle θ4 are recorded as a difference between the current direction and the true north direction. As such, the trajectory (e.g., 650) of the laser receiving device 660 is associated with the direction, preparing for subsequent matching the trajectory of the laser receiving device 660 to the corresponding map.

In a specific operation, after the laser emitting device 620 measures the angle and the distance at one position, the angle θ3 and the distance l3 are recorded and saved as one pair and the angle θ4 and the distance l4 are recorded and saved as another pair. The more such data pairs are collected and the shorter the collection time interval is, the more accurate the trajectory 650 of the detector of the laser receiving device 660 is.

Next, after the data pairs such as (θ3, l3) and (θ4, l4) are obtained, the trajectory map 650 of the laser receiving device 660 can be plotted based on the data pairs. The method for using the laser emitting device 620 to plot the trajectory map obtains the angles and the distances when the laser receiving device 660 is located at least at two different positions, thereby determining the trajectory of the laser receiving device 660.

Finally, the present disclosure also provides a laser ranging system configured to implement the method for measuring the angel and the distance or the method for plotting the trajectory map.

As such, the method for measuring the angle and the distance creatively uses the laser emitting device to track the laser receiving device and records the relative angle and the distance at different positions, respectively. Thus, the position of the laser receiving device relative to the laser emitting device is accurately determined.

Those skilled in the art should understand, in addition to the above laser emitting device capable of tracking, the laser emitting device incapable of tracking and the laser receiving device may cooperate to implement the measurement of the angle and the distance and the plotting of the trajectory map. Specifically, under the circumstance that the laser emitting device and the laser receiving device do not have the communication connection, the detector of the laser receiving device needs to include a timing circuit. The timing circuit is configured to initialize the first angle as 0 degree at the initial position and to record the current position as the initial position. At the initial position, the timing circuit is reset to zero. In addition, the timing circuit knows N counts (e.g., 100) corresponding to the one round of the rotation of the laser emitting device. Then, the laser receiving device moves to a first position different from the initial position. Assuming that after being initialized at the initial position, the timing circuit starts counting at the initial position and counts to M (M is cycled between 0 and 100, e.g., 10) at this time. Then, the difference between the first angle and the second angle is (M/N)*360 degrees. In one embodiment, the difference is (10/100)*360 degrees, that is, 36 degrees.

Here provides more description about how the timing circuit knows the N counts corresponding to one round of the rotation of the laser emitting device. There are many ways to achieve the same. Two embodiments are given below. However, the two embodiments are intended to be illustrative and not restrictive. Those skilled in the art should understand that any modifications made without departing from the inventive concept of the present disclosure fall within the protection scope of the appended claims.

In one embodiment, the N counts may be pre-configured. For example, a value is pre-configured at the time the timing circuit starts to operate. The value corresponds to one of many cooperation modes between the laser emitting device and the laser receiving device. For example, the value is pre-configured to be 80, that is, the timing circuit counts to 80 after the laser beam emitted from the laser emitting device rotates for one round.

In another embodiment, the laser receiving device detects the N counts by itself. For example, at the beginning, the laser receiving device remains at the initial position for a certain time to detect a cycle that the laser receiving device receives the laser beam emitted from the laser emitting device. For example, for every 100 counts, the laser receiving device receives the laser beam emitted from the laser emitting device once. That is, the timing circuit counts to 100 after the laser beam emitted from the laser emitting device rotates for one round.

Those skilled in the art should understand that changes and modifications may be made to various embodiments disclosed above without departing from the spirit of the present disclosure. Thus, the protection scope of the present disclosure should be defined by the appended claims.

Although different exemplary embodiments of the present disclosure have been described, it is apparent to those skilled in the art that different changes and modifications can be made to implement one or more features and advantages of the present disclosure without departing from the spirit of scope of the present disclosure. For those skilled in the art, other components implementing the same function may be replaced appropriately. It should be understood that features described herein with reference to particular drawings may be combined with features of other drawings even in those cases such combination are not explicitly mentioned. In addition, the method of the present disclosure may be implemented in software using appropriate processor instructions or in combination of hardware logic and software logic to achieve the same result. Such modifications to the solutions of the present disclosure are intended to be covered by the appended claims.

What is claimed is:

1. A method for measuring an angle and a distance, comprising:
    at an initial position, after a laser emitting device aligns with a laser receiving device, recording a first angle and measuring a first distance between the laser emitting device and the laser receiving device; and
    moving the laser receiving device from the initial position to a first position, and after the laser emitting device realigns with the laser receiving device, recording a second angle and measuring a second distance between the laser emitting device and the laser receiving device,
    wherein measuring the first distance between the laser emitting device and the laser receiving device includes:
        using a first laser emitting component of the laser emitting device to emit a vertical laser beam rotating in a vertical plane at a first rotation speed;
        using a first optical detection component and a second optical component that are at least partially located on a same vertical plane to calculate a time difference when the vertical laser beam reaches the first optical detection component and the second optical detection component, wherein a distance between the two optical components is called a first separation distance; and
        according to the first rotation speed, the first separation distance, and the time difference, calculating the first distance.

2. The method according to claim 1, wherein:
the laser receiving device includes a timing circuit configured to obtain a difference between the first angle and the second angle.

3. The method according to claim 2, wherein:
the timing circuit is reset at the initial position.

4. The method according to claim 1, further comprising:
rotating the laser receiving device around the laser emitting device for at least one round.

5. The method according to claim 1, further comprising:
after the laser emitting device aligns with the laser receiving device, recording at a pre-determined time interval a rotated angle of the laser emitting device and a corresponding distance between the laser emitting device and the laser receiving device.

6. The method according to claim 1, wherein:
the first angle and the second angle are recorded as a difference between a current direction and a true north direction.

7. The method according to claim 6, wherein:
the true north direction is indicated by means of an orientation sensor.

8. The method according to claim 1, further comprising:
recording and saving the first angle and the first distance as one pair; and
recording and saving the second angle and the second distance as another pair.

9. The method according to claim 7, wherein:
the laser receiving device is vertically set by a universal joint or a horizontally-set bearing.

10. The method according to claim 7, wherein:
the laser receiving device is vertically set by an angle sensor and a control motor.

11. A method for plotting a trajectory map comprising:
at an initial position, after a laser emitting device aligns with a laser receiving device, recording a first angle and measuring a first distance between the laser emitting device and the laser receiving device, and recording and saving the first angle and the first distance as a first data pair;
moving the laser receiving device from the initial position to at least one first position, and after the laser emitting device realigns with the laser receiving device, recording at least one second angle and measuring at least one second distance between the laser emitting device and the laser receiving device, and recording and saving the at least one second angle and the at least one second distance as at least one second data pair; and
based on the first data pair and the at least one second data pair, plotting the trajectory map of the laser receiving device.

12. The method according to claim 11, wherein:
the laser receiving device includes a timing circuit configured to obtain a difference between the first angle and the second angle.

13. The method according to claim 12, wherein:
the timing circuit is reset at the initial position.

14. The method according to claim 11, further comprising:
rotating the laser receiving device around the laser emitting device for at least one round.

15. The method according to claim 11, further comprising:
after the laser emitting device aligns with the laser receiving device, recording at a pre-determined time interval a rotated angle of the laser emitting device and a corresponding distance between the laser emitting device and the laser receiving device.

16. The method according to claim 11, wherein:
the first angle and the second angle are recorded as a difference between a current direction and a true north direction.

17. The method according to claim 16, wherein:
the true north direction is indicated by means of an orientation sensor.

18. The method according to claim 11, wherein measuring the first distance between the laser emitting device and the laser receiving device further includes:
using a first laser emitting component of the laser emitting device to emit a vertical laser beam rotating in a vertical plane at a first rotation speed;
using a first optical detection component and a second optical component that are at least partially located on a same vertical plane to calculate a time difference when the vertical laser beam reaches the first optical detection component and the second optical detection component, wherein a distance between the two optical components is called a first separation distance; and
according to the first rotation speed, the first separation distance, and the time difference, calculating the first distance.

19. A laser ranging system, wherein:
the laser ranging system is configured to measure an angle and a distance and plotting a trajectory map, including:
at an initial position, after a laser emitting device aligns with a laser receiving device, recording a first angle and measuring a first distance between the laser emitting device and the laser receiving device; and
moving the laser receiving device from the initial position to a first position, and after the laser emitting device realigns with the laser receiving device, recording a second angle and measuring a second distance between the laser emitting device and the laser receiving device;
at an initial position, after a laser emitting device aligns with a laser receiving device, recording a first angle and measuring a first distance between the laser emitting device and the laser receiving device, and recording and saving the first angle and the first distance as a first data pair;
moving the laser receiving device from the initial position to at least one first position, and after the laser emitting device realigns with the laser receiving device, recording at least one second angle and measuring at least one second distance between the laser emitting device and the laser receiving device, and recording and saving the at least one second angle and the at least one second distance as at least one second data pair; and
based on the first data pair and the at least one second data pair, plotting the trajectory map of the laser receiving device.

* * * * *